Nov. 15, 1949 A. H. CHARLAND 2,487,851
HEAT EXCHANGE SYSTEM FOR HEATING AND COOLING
Filed Jan. 31, 1947 3 Sheets-Sheet 1

INVENTOR.
ALBERT H. CHARLAND
BY
Brown, Jank & Lynnestvedt
AGENTS

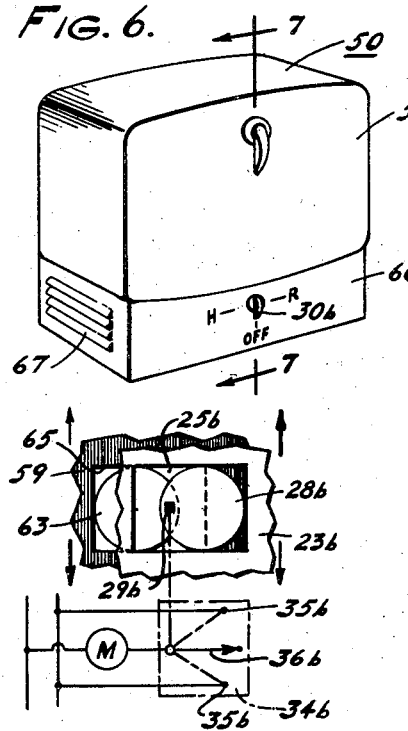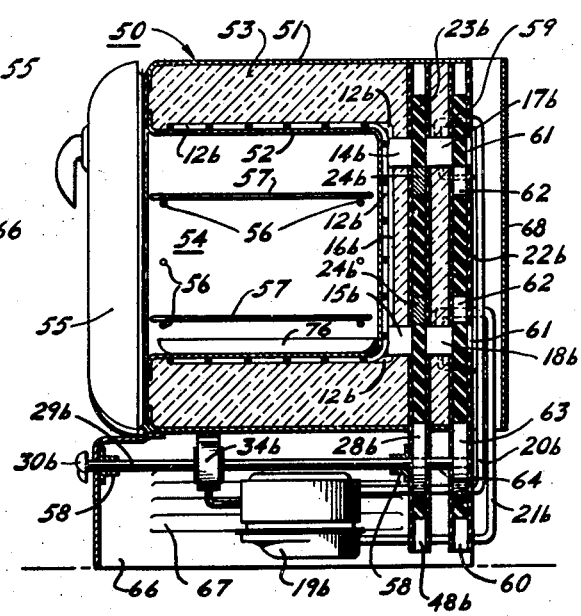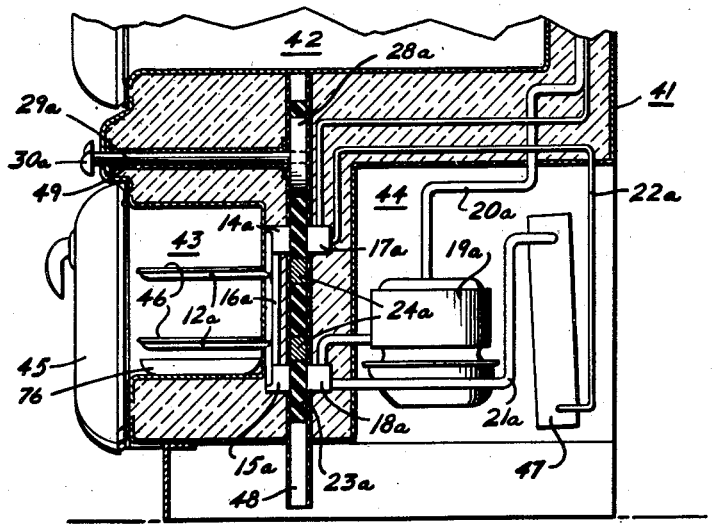

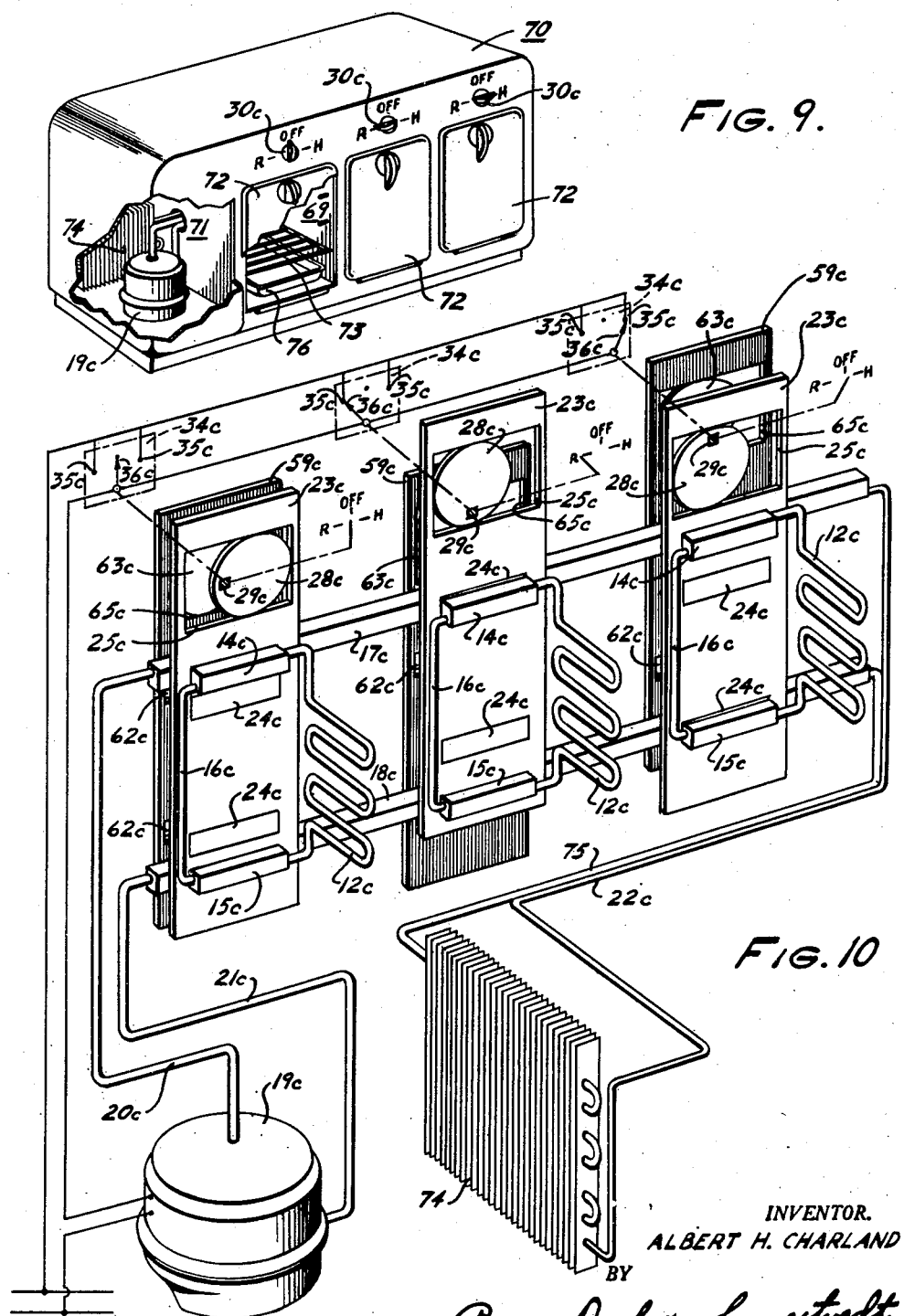

Patented Nov. 15, 1949

2,487,851

UNITED STATES PATENT OFFICE 2,487,851

HEAT EXCHANGE SYSTEM FOR HEATING AND COOLING

Albert H. Charland, Rosemont, Pa., assignor to Philco Corporation, Philadelphia, Pa., a corporation of Pennsylvania Application January 31, 1947, Serial No. 725,475

28 Claims. (Cl. 62—125)

The present invention relates to heat exchange systems and, more particularly, to systems which utilize volatile refrigerant to effect transfer of heat. Specifically, the invention has to do with a novel arrangement including secondary refrigerant circulating means adapted to lower the temperature inside an enclosure, due to removal of heat absorbed by liquid refrigerant in process of evaporation within the secondary system, or to elevate the temperature inside the enclosure, due to introduction of heat rejected by vapor-laden refrigerant in process of condensation within said system.

It is, therefore, the primary object of this invention to utilize refrigerant in a secondary system, as the medium which transfers heat out of or into the enclosure, for the purpose of cooling or heating the same. To that end, the invention employs a secondary refrigerant circulating system disposed in heat exchange relationship with the enclosure and adapted for heat exchange relationship with heat-absorbing means or with heat-rejecting means. The heat exchange between the heat-absorbing means and the secondary system and between the heat-rejecting means and said system, is so controllable that, in one condition, a portion of the secondary refrigerant circulating system serves as an evaporator which cools the enclosure and, in another condition, this same portion serves as a condenser which heats said enclosure.

It is also an object of the invention to provide a simplified arrangement which makes it possible to effect cooling or heating of an enclosure by utilizing the thermodynamic properties of a volatile refrigerant. For that purpose, the invention employs means adapted for association with a closed circulatory system throughout which refrigerant flows at substantially uniform pressures. In accordance with the invention, the means above referred to is selectively operable either to provide for vaporization of liquid refrigerant in a portion of the system in heat exchange relationship with the enclosure, or to provide for condensation of heat-laden refrigerant in that same portion of the system.

It is also an object of the invention to provide an arrangement including means whereby heat exchange between associated elements of two separate and individual refrigerant circulating systems can be selectively controlled so that refrigerant in one system will react on refrigerant in the other system to effect either cooling or heating of an enclosure. An arrangement of this kind has the advantage that the cooling or heating cycle is not dependent upon reversal of the flow of compressed and expanded refrigerant through an evaporator and a condenser. This feature of the invention eliminates the undesirable use of valve mechanism in the refrigerant circulating arrangement and, therefore, reduces the possible causes of failure in the operation of such an arrangement.

A further object of the invention is to associate and to relate primary and secondary refrigerant circulating systems in such a manner that the operation of the secondary system is controllable at will, either to cool or to heat an enclosure. Basically, this object of the invention is obtained by associating a secondary refrigerant circulating coil in heat exchange relationship with the enclosure, and by so relating portions of the primary and secondary systems that selective heat exchange between certain of said portions is effected to cause refrigerant in the secondary system to absorb heat from the enclosure or to reject heat therein.

Still another and more specific object of the invention resides in the provision of an arrangement whereby the interior of a food storage compartment is either cooled or heated by cooling or heating effects of a secondary refrigerant, which effects are obtained by conditions under control of the user. This particular feature of the invention is especially useful in that it makes possible the provision of a compartment in which frozen food may be stored and kept at a temperature sufficient to prevent thawing, and in which the frozen food may be heated and thawed whenever it is desired to do so. The advantages derived from the use of the invention for this specific purpose are that the same means are employed to refrigerate and to thaw the food, and that either refrigeration or heat is readily obtained by making a simple manual adjustment.

These and other objects of the invention, and the manner in which they are obtained, will be more fully understood from the following description based on the accompanying drawings, which illustrate a preferred embodiment of the invention and several practicable applications thereof.

In the drawings:

Figure 5 is a vertical cross-sectional view of a portion of a household refrigerator provided with an arrangement in accordance with the invention;

Figure 6 is a perspective view of a specially constructed unit embodying the invention;

Figure 7 is an enlarged cross-sectional view looking in the general direction of line 7—7 of Figure 6;

Figure 8 is a schematic view illustrating the construction and operation of the mechanism for controlling the function of an arrangement as shown in Figures 6 and 7;

Figure 9 is a perspective of another specially constructed unit embodying the invention; and Figure 10 is a diagrammatic view, in perspective, illustrating the construction and operation of the arrangement embodied in a unit as shown in Figure 9.

Figure 1:
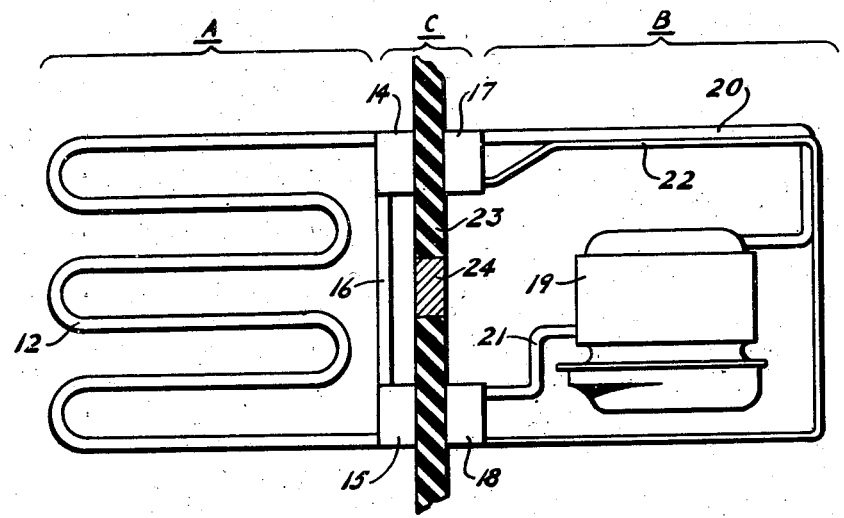
Figure 1 is a diagrammatic view of a system arranged in accordance with the present invention.

With particular reference to the drawings, the general arrangement as shown in Figure 1, includes means A providing for the circulation of refrigerant in heat exchange relationship with an enclosure; means B providing heat-absorbing and heat rejecting elements adapted for heat exchange relationship with said refrigerant circulating means; and, means C providing for heat exchange between said circulating means and either of said elements, selectively.

In the form illustrated in Figure 1, the circulating means A comprises a closed secondary system which is charged with volatile refrigerant. This system includes a coil section 12 adapted for heat exchange relationship with an enclosure (not shown). One end of coil 12 communicates with a refrigerant collecting portion or header 14, and the other end of said coil communicates with another refrigerant collecting portion or header 15. One header 14 is disposed at a higher level than the other header 15, and a conduit 16 establishes communication between both headers.

In the arrangement illustrated in Figure 1, the means B comprises a primary refrigerant circulating system including an evaporator 17 and a condenser 18. The evaporator constitutes the above mentioned heat-absorbing element and is disposed for heat exchange relationship with the secondary upper header 14, and the condenser constitutes the above mentioned heat-rejecting element and is disposed for heat exchange relationship with the secondary lower header 15. Evaporator 17 and condenser 18 communicate with a motor-compressor 19 which is adapted to withdraw heat-laden refrigerant vapor from the evaporator, through suction line 20, and which is adapted to discharge compressed refrigerant vapor into the condenser, through conduit 21. In the condenser, the vapor gives up its heat and reverts to liquid state. A suitable flow restrictor, such as a capillary tube 22, is provided for the feeding of liquified refrigerant from the condenser to the evaporator in which the liquid evaporates and absorbs heat in the process.

As is also illustrated in Figure 1, the means C comprises a structure including an adjustable member 23 which, in the form shown, is a slide of rigid insulating material having at least one insert 24 of suitable conducting material. This slide member 23 is conveniently mounted for adjustment in various positions. In one position (Figure 1), portions of the slide members insulate the primary evaporator and the primary condenser from their associated secondary headers. In another position (Figure 2), the insert 24 establishes heat exchange between the primary evaporator and the secondary upper header, and a portion of said member insulates the primary condenser from the secondary lower header. In still another position (Figure 3) the insert 24 establishes heat exchange between the primary condenser and the secondary lower header, and a portion of said member insulates the primary evaporator from the secondary upper header.

Figure 2:
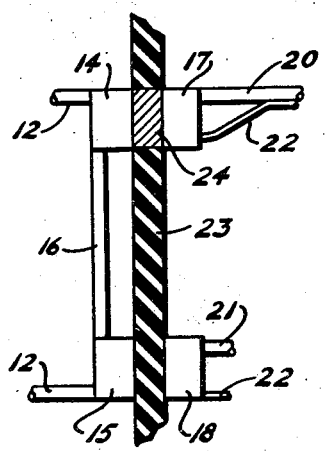
Figure 2 is a view of a portion of the arrangement shown in Figure 1, and illustrates the heat transfer controlling means in one operative position.

When the adjustment is as represented in Figure 2, liquid secondary refrigerant evaporates in coil 12. The evaporating secondary refrigerant picks up heat from within the enclosure and cools the same. The heat-laden refrigerant vapor rises in coil 12 and enters upper header 14 which is then in heat exchange relationship with primary evaporator 17. In the upper header, the vapor is restored to liquid state by giving up heat which is absorbed by vaporization of primary refrigerant in said evaporator 17. From the upper header, the liquified secondary refrigerant gravitates, through conduit 16, into lower header 15. As liquid refrigerant accumulates in said header 15 and conduit 16, it rises in coil 12 and reevaporates therein. Therefore, as long as the above described conditions prevail, the secondary refrigerant circuit is, in effect, a closed secondary refrigerating system in which the evaporator is coil 12 in heat exchange with the enclosure, and in which the condenser is upper header 14 in heat exchange with the cold primary evaporator 17.

Figure 3:
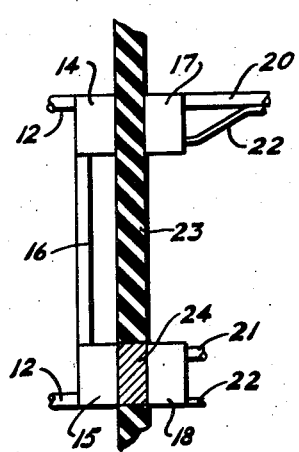
Figure 3 is a view similar to Figure 2 but illustrates the heat transfer controlling means in another operative position.

When the adjustment is as represented in Figure 3, liquid secondary refrigerant in lower header 15 absorbs heat from the primary condenser 18, which is then in heat exchange relationship with said lower header, so that heat-laden vapor passes into the coil 12. There, the vapor gives up heat to the enclosure, and thus heats the same. In giving up heat, the vapor liquifies, and the liquid drops back into lower header 15 to reabsorb heat. In this latter condition, the secondary refrigerant circuit is, in effect, a secondary refrigerating system in which the evaporator is lower header 15 in heat exchange with the hot primary condenser 18, and in which the condenser is coil 12 in heat exchange with the enclosure.

Figure 4:
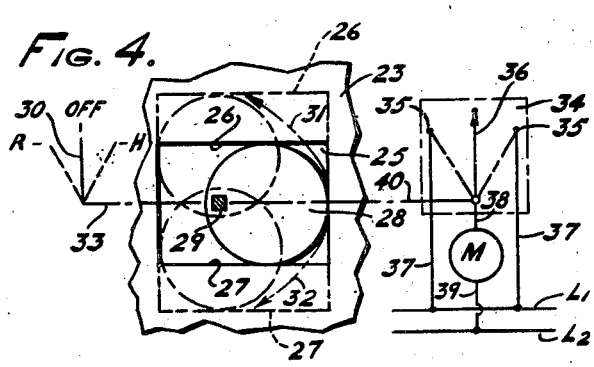
Figure 4 is a schematic illustration of a convenient means for adjusting the heat transfer controlling means and for controlling the operation of the system.

Convenient means to adjust the slide member 23 is shown in Figure 4. As illustrated, the slide member is provided with a substantially rectangular recess or opening 25 which, in practice, is centered with respect to the width of said member. Two of the opposite marginal edges of the recess or opening, specifically, the upper edge 26 and the lower edge 27 are adapted for engagement with the periphery of a cam comprising a disc 28 eccentrically carried on a rotatable shaft 29. Shaft 29 is conveniently rotated by means of a manually operable element 30, which, in practice, is associated with shaft 29, as indicated by line 33. As can be seen in Figure 4, rotation of the disc imparts longitudinal movement to the slide member. It is to be noted that the size and eccentricity of the disc 28, and the relative length and width of the recess or opening 25, are such that when said disc is rotated counterclockwise, as represented by arrow 31 (Figure 4), said disc bears on edge 26 and causes slide member 23 to move the required distance to bring insert 24 (see Figure 2) between the secondary upper header 14 and the primary evaporator 17. However, when disc 28 is rotated clockwise, as represented by arrow 32 (Figure 4), said disc bears on edge 27 and causes slide member 23 to move the required distance to bring said insert 24 (see Figure 3) between the secondary lower header 15 and the primary condenser 18.

The slide actuating means above described may be conveniently associated with means effective to control the starting and stopping of the motor-compressor which, in turn, controls the operation of the primary system. This is obtained by associating a switch 34 with the rotatable shaft 29, as is systematically illustrated in Figure 4. As shown, the switch includes two fixed contact points 35 and a movable contactor 36, the latter being adapted for engagement with either of said fixed contact points. These fixed contact points are connected by means of conductors 37 to one side of a source of electrical energy, for instance, to line $L_1$ of an alternating current circuit. The movable contactor 36 is electrically connected to motor M of the motor-compressor, by means of a conductor 38, and the motor in turn is connected by means of a conductor 39, to the other side $L_2$ of said source. In practice, movable contactor 36 is mechanically associated with shaft 29, as is indicated by line 40.

From the foregoing description of the combination slide and switch operating mechanism, it will be understood that control of the arrangement, in accordance with the invention, is obtained by single adjustment of the manually operable member 30. When this member 30 is adjusted in "off" position (Figure 4), the disc 28 places the slide 23 in neutral position (Figure 1), and the movable contactor 36 (Figure 4) is moved to open the motor circuit. When manually operable member 30 is adjusted in "cooling" or "refrigerating" position R (Figure 4), the disc 28 moves the slide 23 to the corresponding position (Figure 2), and the movable contactor 36 (Figure 4) is moved to engage one of the fixed contact points 35 and thus closes the motor circuit. When said member 30 is adjusted in "heating" position H (Figure 4), disc 28 moves slide 23 to the corresponding position (Figure 3), and movable contactor 36 is moved to engage the other of said fixed contact points (Figure 4) and again closes the motor circuit.

In Figure 5, I have shown the application of the invention to an ordinary household refrigerator. As illustrated, the refrigerator is of the kind comprising a cabinet structure 41 having wall portions which cooperate to define a main insulated compartment 42, an auxiliary insulated compartment 43 and a machinery compartment 44, said auxiliary and machinery compartments being located below the main compartment.

The auxiliary insulated compartment 43 is closed by means of a suitable door 45 and provides the enclosure which, in accordance with the invention, is to be selectively cooled or heated. For that purpose, coil 12a of a secondary refrigerant circulating system is conveniently arranged in heat exchange relationship with the auxiliary compartment. In the construction shown in Figure 5, the coil is associated with shelves 46 which are provided in said auxiliary compartment. The opposite ends of coil 12a communicate with upper and lower headers 14a and 15a, respectively, and a conduit 16a establishes communication between both headers. In order that the secondary system may operate in the manner previously described, the upper header is disposed for heat exchange relationship with heat absorbing element 17a, and the lower header 15a is disposed for heat exchange relationship with heat rejecting element 18a, said elements being included in a primary refrigerant circulating system of the type commonly used in household refrigerators. As can be seen in Figure 5, the heat absorbing element 17a is interposed in liquid line or capillary tube 22a leading from the usual condenser 47 to the ordinary evaporator (not shown) which is employed to cool the main compartment 42 and which is in communication, through suction line 20a, with the intake of motor-compressor 19a conveniently mounted in the machinery compartment. The heat rejecting element 18a is interposed in a conduit 21a which leads from the discharge of the motor-compressor to the mentioned condenser 47, the latter being also conveniently mounted in said machinery compartment. The upper and lower headers included in the secondary system, as well as their associated heat absorbing and heat rejecting elements included in the primary system, are mounted in the insulation of the auxiliary compartment. This makes it possible to obtain full benefit from the cooling effect of said heat absorbing element on the upper header and full benefit from the heating effect of said heat rejecting element on the lower header.

Selective heat exchange between the headers and their associated heat absorbing and heat rejecting elements, is accomplished by means of a slide member 23a which is constructed as previously described, with the exception that two metallic inserts 24a are provided in said member, one insert being adapted for cooperation with the upper header and associated heat absorbing element, and the other insert being adapted for cooperation with the lower header and associated heat rejecting element. The provision of the two inserts reduces the travel of slide member 23a to a minimum so as to cut down the space required for the mounting and operation of said member. In practice, this slide member is advantageously mounted in a guide 48, which also serves as a means to support and to maintain the headers and their associated heat absorbing and heat rejecting elements in proper registration. The guide, as shown in Figure 5, is preferably made of suitable non-conducting rigid material. However, if it should be desired to provide a metal guide, suitable breaker strips may be employed to insulate such guide from the headers and from the heat absorbing and rejecting elements.

In the form illustrated in Figure 5, the slide member 23a is adapted for adjustment in three positions. In one position, that is in the "off" position, portions of member 23a insulate headers 14a and 15a from their associated heat absorbing and heat rejecting elements 17a and 18a. In another position, that is in the "cooling" or "refrigerating" position, one of the inserts 24a establishes heat exchange between the upper header and the heat absorbing element, and a portion of said member insulates the lower header from the heat rejecting element. In a third position, that is in the "heating" position, the other insert establishes heat exchange between the lower header and the heat rejecting element, and another portion of said member insulates the upper header from the heat absorbing element. Adjustment of the slide member 23a to its various positions, is accomplished by means of a cam disc 28a, which is mounted and operates in the manner shown in previously described Figure 4. Accordingly, a shaft 29a to which said disc is eccentrically connected, is rotatably supported, for instance, in a sleeve bearing 49. The free end of the shaft projects outside the cabinet structure and carries a handle or knob 30a. In the arrangement shown in Figure 5, the motor controlling switch referred to in the description of Figure 4, is not used because the motor-compressor is included in the system which is adapted to cool the main compartment of the refrigerator in the usual way.

In Figures 6 and 7, I have shown a specially constructed unit which embodies the invention. In practice, this unit is preferably of small dimensions, being designed to be placed on a table, cabinet base, or the like. The unit comprises a housing 50 which, as shown in Figure 7, consists of an outer liner 51, an inner liner 52 and insulation 53 between said liners. The inner liner defines a compartment 54 having a front access opening which is closed by means of a door 55. Convenient means, such as pins 56, are provided on opposite side walls of the inner liner and serve to support adjustable shelves 57.

In accordance with the invention, compartment 54 is adapted to be selectively cooled or heated. This is accomplished, in the form shown in Figure 7, by arranging in heat exchange with the inner liner 52, the serpentine coil 12b of a secondary refrigerant circulating system which also includes upper header 14b in communication with one end of coil 12b, lower header 15b in communication with the other end of said coil, and conduit 16b adapted to place said headers in communication with each other. This secondary refrigerant circulating system is adapted to operate in the manner hereinbefore described and, therefore, the headers 14b and 15b are disposed for heat exchange relationship with heat absorbing and heat rejecting elements 17b and 18b, respectively. These elements are included in a primary refrigerant circulating system which is similar to that shown in Figure 1. Accordingly, the heat absorbing element 17b and the heat rejecting element 18b communicate with a motor compressor 19b through suction line 20b and discharge conduit 21b, and a suitable flow restrictor or capillary tube 22b interconnects the mentioned elements.

Heat exchange between the headers and their associated heat absorbing and heat rejecting elements, is controlled by means of a slide member 23b which is made of insulating material and is provided with relatively spaced inserts 24b of conducting material. One of said inserts is disposed for cooperation with the upper header and the heat absorbing element, and the other insert is disposed for cooperation with the other header and the heat rejecting element. Member 23b is adjustable in the three positions previously described, that is; in an "off" position in which portions of the member insulates the headers from the heat absorbing and heat rejecting elements; in a "cooling" or "refrigerating" position in which one insert establishes heat exchange between the upper header and the associated heat absorbing element, and a portion of the member insulates the lower header from the associated heat rejecting element; and, a "heating" position in which the other insert establishes heat exchange between the lower header and associated heat rejecting element, and another portion of the member insulates the upper header from its associated heat absorbing element. The slide member is mounted in a guide 48b and is adjusted by means of cam disc 28b eccentrically mounted on shaft 29b which is rotatably supported in bearings 58, and which shaft is provided with an actuating handle or knob 30b.

As can be seen in Figure 7, the upper and lower headers, and the heat absorbing and heat rejecting elements are located in the insulation, for the purpose previously stated. However, since in the arrangement shown in Figure 7, the heat absorbing element 17b is the sole evaporator in the primary system and, since the heat rejecting element is the sole condenser in said system means are provided to expose the heat rejecting element to the ambient air during a refrigerating cycle, and to expose the heat absorbing element to the ambient air during a heating cycle. By exposing the heat rejecting element to the ambient air during a refrigerating cycle, the vaporized primary refrigerant is adequately condensed to insure the presence of liquified primary refrigerant which absorbs the heat pick-up from the compartment 54 by the secondary refrigerant. By exposing the heat absorbing element to the ambient air during a heating cycle, the liquified primary refrigerant absorbs heat from the ambient air to insure the presence of heat-laden primary refrigerant which gives up its heat to the secondary refrigerant which, in turn, rejects its heat into the compartment.

In the construction shown in Figure 7, the means for accomplishing the above stated functions, include a slide member 59 which is mounted in guide 60. This guide is provided with windows 61 adapted to expose the heat absorbing and the heat rejecting elements to the ambient air. The slide member 59, in turn, is provided with openings 62 which, by adjustment of said member, are adapted to be brought into and out of registration with heat absorbing and heat rejecting elements 17b and 18b and with windows 61, thereby either establishing or preventing communication of said heat absorbing and heat rejecting elements with the ambient air through said windows.

Adjustment of slide member 59 is obtained by means of a cam disc 63 which, in construction and operation, is identical to cam disc 28b employed for adjustment of the previously described slide member 23b. As shown in Figure 7, the cam disc 63 is conveniently fixed to an extension 64 of shaft 29b which carries cam disc 28b. In this manner both discs and, consequently, both slide members are actuated in synchronism, by manipulation of a single element, which is the handle or knob 30b. As also shown in Figure 7, switch 34b adapted to control the operation of motor-compressor 19b, is mounted for association with the shaft 29b so that this switch is, likewise, operated in synchronism with the slide members through manipulation of said handle or knob.

This synchronized operation of the slide member and switch clearly appears in Figure 8 in which the illustrated parts are shown in the "off" position, which position corresponds to the position shown in Figure 7. In this "off" position, the slide members are adjusted in an intermediate position and movable contact 36b is removed from fixed contacts 35b so that the circuit through the motor M of the motor-compressor, is open. As illustrated in said Figure 8, the cam discs 28b and 63 are arranged for engagement within corresponding recesses or openings 25b and 65 in slide members 23b and 59. However, it is to be noted that these cam discs are relatively disposed to extend eccentrically, in opposite direction from the axis of shaft 29b. Thus, it will be understood that adjustment of handle or knob 30b from the "off" position to the "cooling" or "refrigerating" position R (Figure 6) rotates shaft 29b in counterclockwise direction as viewed in Figure 8. Rotation of the shaft in this counterclockwise direction, rotates cam disc 28b to lift slide member 23b and rotates cam disc 63 to lower slide member 59, as is indicated by the bold arrows, and at the same time, actuates movable contact 36b to engage one of the fixed contacts 35b. This adjustment places the secondary upper header in heat exchange relationship with the primary heat absorbing element, places the primary heat rejecting element in heat exchange relationship with the ambient air, and closes the circuit through the motor-compressor. However, if the handle or knob 30b is adjusted to the "heating" position H (Figure 6) shaft 29b is rotated in the other or clockwise direction as viewed in Figure 8. Rotation of the shaft in this latter or clockwise direction, rotates cam disc 28b to lower slide member 23b and rotates cam disc 63 to lift slide member 59, as is indicated by the light arrows, and at the same time, actuates movable contact 36b to engage the other fixed contact. This latter adjustment places the secondary lower header in heat exchange relationship with the primary heat absorbing element, places the primary heat rejecting element in heat exchange relationship with the ambient air and again closes the circuit through the motor-compressor.

As shown in Figure 7, the motor compressor 19b, as well as shaft 29b and switch 34b, are conveniently located in the housing base 66. Louvres 67 are conveniently provided in the base for the admission and circulation of air therethrough for the purpose of cooling the motor-compressor, and a flue 68 is advantageously used to direct ambient air in a path passing windows 61 so as to insure effective heat exchange between said air and exposed heat absorbing element 17b or exposed heat rejecting element 18b.

In Figures 9 and 10, I have shown another specially devised unit which, in general construction and operation, resembles the unit above described and shown in Figures 6 and 7, but which is provided with a plurality of insulated compartments such as the one shown at 69 in Figure 9. These compartments are provided in a housing 70 which also provides a machinery enclosure 71. Each compartment has its own door 72, and may be supplied with shelves similar to the one shown at 73.

In accordance with the invention, the compartments are adapted to be individually and selectively cooled or heated. For that purpose, each compartment is provided with its own secondary refrigerant circulating system, as is diagrammatically illustrated in Figure 10. The coil 12c of each secondary system is adapted to be arranged in heat exchange relationship with its corresponding compartment, for example, by association with shelves in the manner shown in Figure 5 or with the inner walls of the compartment in the manner shown in Figure 7. Each secondary system also includes an upper header 14c, a lower header 15c and a conduit 16c between said headers.

The upper headers are disposed for heat exchange relationship with a heat absorbing element 17c which is included in a primary refrigerant circulating system, and which is common to all of said upper headers. The lower headers are disposed for heat exchange relationship with a heat rejecting element 18c which is also included in the primary refrigerant circulating system and is common to all of said lower headers. The heat absorbing element is connected with the intake of a motor-compressor 19c by means of a suction line 20c, and the discharge of said motor-compressor is connected to the heat rejecting element by means of a conduit 21c. Because of the increased amount of primary refrigerant needed to perform the additional work necessitated by the use of multiple secondary systems, it is desirable to provide additional condensing means in the form of an ordinary condenser 74. Such a condenser is conveniently mounted in the machine compartment 71 (Figure 9) and as shown particularly in diagrammatic Figure 10, communicates the heat rejecting element 18c through conduit 75 and with the heat absorbing element 17c through flow restrictor or capillary tube 22c.

Selective heat transfer between upper headers 14c and the heat absorbing element 17c or between lower headers 15c and the heat rejecting element 18c, is obtained in the same manner as previously explained in reference to Figures 6–8. Accordingly, as will clearly appear from Figure 10, sets of slide members 23c and 59c are co-operatively associated with the secondary systems. In practice, the sets of slide members are mounted in the insulation at the rear of the associated compartment, in the manner shown in Figure 7. The slide members 23c are provided with metallic inserts 24c and the slide members 59c are provided with openings 62c for the purposes which have also been described previously in connection with the arrangement shown in Figures 6–8. The slide members are also provided with recesses or openings 25c and 65c in which sets of cam discs 28c and 63c are fitted. The cam discs of each set are fixed eccentrically on a rotatable shaft 29c, which protrudes through the front of the housing and, as shown in Figure 9, the protruding ends of the shafts carry handles or knobs 30c adapted to be manipulated for adjustment in "off" position, in "cooling" or "refrigerating" position R, or in "heating" position H. These positions are illustrated in Figure 9 and are also diagrammatically represented in Figure 10.

Diagrammatic Figure 10 further shows the relative positions which the slide members assume when the controls are adjusted to obtain the various effects above mentioned. As also indicated in diagrammatic Figure 10, the shafts 29c are operatively associated with switches 34c, each of which includes fixed contacts 35c and a movable contact 36c, the latter moving under control of the associated shaft. It is to be noted that the switches are so related that when all the controls are adjusted in the "off" position, the circuit through the motor-compressor is open but, when one or more of the controls are adjusted to effect either cooling or heating of one or more compartments, the circuit through the motor-compressor is closed. The switches 34c and the handles or knobs 30c are, in practice, associated with the shafts 24c in the manner illustrated in previously described Figure 7.

As shown in Figures 5, 7 and 9 of the drawings, a suitable pan 76 is conveniently arranged in compartments 43, 54 and 69 in order to provide means for receiving condensate which may form in said compartments.

In using an arrangement as shown in either Figure 5 or Figure 7, food placed in compartment 43 or 54 may be kept at cold temperatures as long as the control is adjusted in the "cooling" or "refrigerating" position. The food, however, may be subjected to warm temperatures by mere manipulation of handle or knob 30a or 30b to the "heating" position. When the arrangement is not in use, the cooling or heating effect of the refrigerant may be discontinued by adjusting said handle or knob to the "off" position.

In using a unit of the kind shown in Figure 9, food may be placed in any one or in all of the compartments, and such food may be subjected selectively to cooling or heating temperatures depending upon the selective adjustment of handles or knobs 30c. Also, when such a unit is not in use, cooling and heating effects within the compartments may be stopped by adjustment of the handles or knobs to "off" position.

From the foregoing description, it will be appreciated that the invention provides a simple yet dependable arrangement whereby the thermodynamic properties of refrigerant may be employed to produce selective heating or cooling effects within an enclosure. The simplicity and dependability of the arrangement result from the fact that the invention makes it possible to control heat exchange between portions of primary and secondary refrigerant circulating systems, so that the secondary refrigerant can be used as the medium which removes heat from or introduces heat in the inclosure. Specifically, the arrangement, in accordance with the invention, is most useful in that it can be readily associated with existing refrigerating apparatus, such as household refrigerators, or it can be conveniently incorporated in specially devised units. In either case, the arrangement is selectively adjustable and effective either to keep commodities, such as frozen food, at temperatures that will prevent thawing or to subject such commodities to temperatures which will cause thawing. With respect to this particular use of this invention, it is to be understood that although a manual adjustment from the "cooling" to the "heating" position has been shown and described, this adjustment can be obtained automatically by associating with the control shaft, any suitable known automatic setting means, such as a time clock.

Also, although several arrangements embodying the invention have been described with great particularity, it is to be understood that this has been done by way of example only. Various changes in the details of construction and in the combination and association of parts may be resorted to without departing from the spirit of the invention which is subject only to such limitations as are imposed by the prior art or are specifically called for in the appended claims.

I claim:

1. In an arrangement for selectively cooling or heating an enclosure, means providing for circulation of a refrigerant in heat exchange relationship with the enclosure, means providing heat-absorbing and heat-rejecting elements disposed for heat exchange relationship with said refrigerant in the first mentioned means, and mechanism selectively operable to place either the heat-absorbing element or the heat-rejecting element in heat exchange relationship with said refrigerant, either to absorb heat removed from the enclosure by said refrigerant or to supply heat to be absorbed by said refrigerant and to be thereby rejected within the enclosure.

2. In an arrangement for selectively cooling or heating an enclosure, a refrigerant circulating system having a portion in heat exchange relationship with the enclosure, means disposed for heat exchange relationship with said system and effective to absorb heat removed from the enclosure by vaporization of refrigerant in said portion, means also disposed for heat exchange relationship with said system and effective to supply heat to be absorbed by said refrigerant and to be thereby rejected within the enclosure by condensation of such refrigerant in said portion, and mechanism adjustable to one position for establishing heat exchange between the first mentioned means and the refrigerant in said system and for preventing heat exchange between the second mentioned means and said refrigerant, said mechanism also being adjustable to another position for establishing heat exchange between the second mentioned means and the refrigerant in said system and for preventing heat exchange between the first mentioned means and said refrigerant.

3. In an arrangement for selectively cooling or heating an enclosure, a system including means providing for circulation of refrigerant in heat exchange relationship with the enclosure, a heat absorbing element, a heat rejecting element, and heat transfer means movably mounted for adjustment to a position between said system and one of said elements, or to a position between said system and the other of said elements.

4. In an arrangement for selectively cooling or heating an enclosure, a secondary refrigerant circulating system in heat exchange relationship with the enclosure, a primary refrigerant circulating system having an evaporator and a condenser, and means constructed and arranged for mechanically placing the secondary system in heat exchange relationship with either the evaporator or the condenser of the primary system.

5. In an arrangement for selectively cooling or heating an enclosure, a secondary refrigerant circulating system disposed for heat exchange relationship with the enclosure, a heat absorbing element, a heat rejecting element, and a structure including means adjustable to one position for establishing heat exchange between said system and the heat absorbing element and for insulating said system from the heat rejecting element, and adjustable to another position for establishing heat exchange between said system and the heat rejecting element and for insulating said system from the heat absorbing element.

6. In an arrangement for selectively cooling or heating an enclosure, a secondary refrigerant circulating system disposed for heat exchange relationship with the enclosure, a heat absorbing element, a heat rejecting element, and a structure including means adjustable to one position for establishing heat exchange between said system and the heat absorbing element and for insulating said system from the heat rejecting element, and adjustable to another position for establishing heat exchange between said system and the heat rejecting element and for insulating said system from the heat absorbing element, and further adjustable to still another position for insulating said system from both mentioned elements.

7. In an arrangement for selectively cooling or heating an enclosure, a secondary refrigerant circulating system having a coil arranged in heat exchange relationship with said enclosure, said system further having intercommunicating upper and lower headers, the upper header communicating with one end of said coil, the lower header communicating with the other end of said coil, a primary refrigerant circulating system having an evaporator and a condenser, and means adjustable to effect heat transfer selectively between said upper header and evaporator or between said lower header and condenser.

8. An arrangement according to claim 7, in which the last mentioned means includes an adjustable member and means carried thereby to establish heat transfer selectively between the upper header and the evaporator or between the lower header and the condenser.

9. In an arrangement for selectively cooling or heating an enclosure, a secondary refrigerant circulating system having a coil arranged in heat exchange relationship with said enclosure, said system further having intercommunicating upper and lower headers, the upper header communicating with one end of said coil, the lower header communicating with the other end of said coil, a primary refrigerant circulating system including an evaporator, a condenser and a motor-compressor operable to withdraw primary refrigerant from the evaporator and to discharge compressed primary refrigerant into the condenser, control means adjustable to one position for establishing heat exchange between said upper header and the evaporator and for insulating said lower header from the condenser, and adjustable to another position for establishing heat exchange between said lower header and the condenser and for insulating said upper header from the evaporator, and further adjustable to still another position for insulating said upper header from the evaporator and said lower header from the condenser, and switch means connected with the said control means and operable to stop the operation of the motor-compressor upon adjustment of said control means in the last mentioned position.

10. A combination cooling and heating arrangement comprising a wall structure defining an insulated compartment, shelves in said compartment, means charged with volatile refrigerant and including coil sections arranged in heat exchange relationship with said shelves, and means disposed for heat exchange relationship with said refrigerant in the first mentioned means and selectively operable either to absorb heat removed from the compartment by said refrigerant or to supply heat to be absorbed by said refrigerant and to be thereby rejected into the compartment.

11. In a refrigerator, a cabinet structure having a main insulated compartment and an auxiliary insulated compartment, a secondary refrigerant circulating system having a portion disposed in heat exchange relationship with said auxiliary compartment, a primary refrigerant circulating system including a main evaporator arranged in heat exchange relationship with said main compartment and a main condenser arranged in heat exchange relationship with the ambient air, the primary refrigerant circulating system further including an auxiliary evaporator and an auxiliary condenser, and means included in the cabinet structure and adjustable to place the secondary system in heat exchange selectively with the auxiliary evaporator or with the auxiliary condenser.

12. An arrangement according to claim 11, in which the last mentioned means comprises a member movably mounted within the cabinet structure, and a manually operable element outside the cabinet structure and connected with said member to move the same.

13. An arrangement according to claim 12, in which the movably mounted member is constructed of insulating material and is provided with inserts of conducting material adapted to be adjusted, by movement of said member, to place the secondary refrigerant circulating system in heat exchange relationship selectively with the auxiliary evaporator or with the auxiliary condenser.

14. An arrangement according to claim 11, in which the secondary refrigerant circulating system comprises intercommunicating upper and lower headers and a coil in communication with said headers and in heat exchange with the auxiliary compartment, and in which the adjustable means is operable selectively to place the upper header in heat exchange relationship with the auxiliary evaporator or to place the lower header in heat exchange relationship with the auxiliary condenser.

15. An arrangement according to claim 14 in which the mentioned headers, auxiliary evaporator and auxiliary condenser are located in the insuluation of the auxiliary compartment.

16. In a unit for subjecting food selectively to cooling or to heating effects, a housing providing an insulated compartment, a secondary refrigerant circulating system having a portion disposed in heat exchange relationship with said compartment, a primary refrigerant circulating system including a heat absorbing element and a heat rejecting element, and means adjustable for mechanically placing the secondary system in heat exchange relationship with either the heat absorbing element or the heat rejecting element of the primary system.

17. An arrangement according to claim 16 in which the last mentioned means includes a movably mounted member having means adapted, upon movement of said member to one position, to establish heat exchange between the heat absorbing element and the secondary refrigerant circulating system and, upon movement of said member to another position, to establish heat exchange between the heat rejecting element and said system.

18. In a unit for subjecting food selectively to cooling or to heating effects, a housing providing an insulated compartment, a secondary refrigerant circulating system having a portion disposed in heat exchange relationship with said compartment, and a primary refrigerant circulating system including a heat absorbing element and a heat rejecting element, and means adjustable selectively to establish heat exchange between the heat absorbing element and the secondary refrigerant circulating system and between the heat rejecting element and the ambient air, or between the heat rejecting element and said system and between the heat absorbing element and the ambient air.

19. An arrangement according to claim 18 in which the last mentioned means includes a pair of movably mounted members, one member having means adapted, upon movement of said one member to one position, to establish heat exchange between the heat absorbing element and the secondary refrigerant circulating system, and, upon movement of said member to another position, to establish heat exchange between the heat rejecting element and said system; the other member having means adapted, upon movement of said other member to one position, to establish heat exchange between the heat absorbing element and the ambient air and, upon movement of said other member to another position, to establish heat exchange between the heat rejecting element and the ambient air, and a manually controlled structure cooperatively connected with both members to move the same in synchronism so that when said one member is moved to its first mentioned position, the other member is moved to its second mentioned position, and when said one member is moved to its second mentioned position, said other member is moved to its first mentioned position.

20. In a unit for subjecting food selectively to cooling or to heating effects, a housing providing an insulated compartment, a secondary refrigerant circulating system disposed in heat exchange relationship with said compartment, a primary refrigerant circulating system including a heat absorbing element, a heat rejecting element and a motor-compressor; means adjustable to one position for insulating said elements from said secondary system, adjustable to a second position for establishing heat exchange between heat absorbing element and said system, and adjustable to a third position for establishing heat exchange between the heat rejecting element and said system, and switching means operatively related to said adjustable means and operable to energize the motor-compressor upon adjustment of the adjustable means to either the second or the third mentioned position, and to deenergize the motor-compressor upon adjustment of the adjustable means to the first mentioned position.

21. An arrangement according to claim 20, in which a single manually operable element is connected with and operates both the mentioned adjustable means and the mentioned switching means.

22. In a unit for subjecting food selectively to cooling or to heating effects, a housing providing an insulated compartment, a secondary refrigerant circulating system disposed in heat exchange relationship with said compartment, a primary refrigerant circulating system including a heat absorbing element, a heat rejecting element and a motor-compressor, means adjustable to one position for insulating said elements from said secondary system and from the ambient air, adjustable to a second position for establishing heat exchange between the heat absorbing element and said system and between the heat rejecting element and the ambient air, and adjustable to a third position for establishing heat exchange between the heat rejecting element and said system and between the heat absorbing element and the ambient air, and switching means operatively related to said adjustable means and operable to energize the motor-compressor upon adjustment of the adjustable means to either the second or third mentioned positions and to deenergize the motor-compressor upon adjustment of the adjustable means to the first mentioned position.

23. An arrangement according to claim 22, in which a single manually operable element is connected with and operates the adjustable means and the switching means.

24. In a unit for subjecting food to cooling or heating effects, a housing defining a plurality of compartments insulated from each other, a plurality of separate secondary refrigerant circulating systems, one for each compartment and each system arranged in heat exchange relationship with the corresponding compartment, a primary refrigerant circulating system including a portion for the circulation of cold refrigerant and a portion for the circulation of hot refrigerant, and control means adjustable to place said systems in heat exchange relationship selectively with one or the other of said portions.

25. In a unit for subjecting food to cooling or heating effects, a housing defining a plurality of compartments insulated from each other, a plurality of separate secondary refrigerant circulating systems, one for each compartment and each system arranged in heat exchange relationship with the corresponding compartment, a heat absorbing element, a heat rejecting element, and means disposed to establish heat exchange selectively between the heat absorbing element and said systems, or between the heat rejecting element and said systems.

26. An arrangement according to claim 25, in which the control means comprises a plurality of independently adjustable structures, one for each secondary system, each structure including a slide member selectively movable to one position for insulating the associated secondary system from the heat absorbing and heat rejecting elements, or to a second position for establishing heat exchange between such system and the heat absorbing element, or to a third position for establishing heat exchange between such system and the heat rejecting element.

27. An arrangement according to claim 26, in which the heat absorbing and heat rejecting elements form parts of a primary refrigerant circulating system having a motor-compressor, and in which the control means further includes switches operable to energize the motor-compressor upon adjustment of one or more of the adjustable structures to either the second or third mentioned positions and to deenergize the motor-compressor upon adjustment of the adjustable structures to the first mentioned position.

28. In an arrangement for selectively cooling or heating an enclosure, a secondary volatile refrigerant circulating system in heat exchange relationship with the enclosure, a primary volatile refrigerant circulating system having an evaporator portion and a condenser portion, and means providing for selective placement of said secondary system in heat exchange relationship with either of said portions.

ALBERT H. CHARLAND.

REFERENCES CITED

The following references are of record in the file of this patent:

UNITED STATES PATENTS

| Number | Name | Date |
| --- | --- | --- |
| 1,963,698 | Garre | June 19, 1934 |
| 1,969,187 | Schutt | Aug. 7, 1934 |
| 1,980,688 | Lewis | Nov. 13, 1934 |
| 2,342,174 | Wolfert | Feb. 22, 1944 |